(12) United States Patent
Henrickson (10) Patent No.: US 7,392,423 B2
(45) Date of Patent: Jun. 24, 2008

(54) COMBINED COMPUTER BACKUP, DISASTER RECOVERY AND MIGRATION IN A SHARED ENVIRONMENT

(75) Inventor: David L. Henrickson, Hialeah, FL (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 10/917,638

(22) Filed: Aug. 13, 2004

(65) Prior Publication Data

US 2006/0036895 A1   Feb. 16, 2006

(51) Int. Cl.
*G06F 11/00* (2006.01)
(52) U.S. Cl. .......................................................... 714/4
(58) Field of Classification Search ............... 714/2, 714/3, 4, 6, 7, 12, 13, 42
See application file for complete search history.

(56) References Cited

U.S. PATENT DOCUMENTS

| | | | |
|---|---|---|---|
| 4,958,270 A * | 9/1990 | McLaughlin et al. ............ 700/82 |
| 5,555,416 A | 9/1996 | Owens et al. | |
| 5,870,611 A | 2/1999 | Shrader et al. | |
| 5,915,252 A | 6/1999 | Misheski et al. | |
| 6,029,232 A | 2/2000 | Masahiko | |
| 6,192,518 B1 | 2/2001 | Neal | |
| 6,202,073 B1 | 3/2001 | Takahashi | |
| 6,219,669 B1 | 4/2001 | Haff et al. | |
| 6,449,733 B1 * | 9/2002 | Bartlett et al. ................. 714/13 |
| 6,460,055 B1 * | 10/2002 | Midgley et al. ............. 707/204 |
| 6,611,923 B1 * | 8/2003 | Mutalik et al. .................. 714/4 |
| 6,625,622 B1 | 9/2003 | Henrickson et al. | |
| 6,625,623 B1 * | 9/2003 | Midgley et al. ............. 707/204 |
| 6,671,705 B1 | 12/2003 | Duprey et al. | |
| 6,865,655 B1 | 3/2005 | Andersen | |
| 6,912,384 B2 | 6/2005 | Huomo et al. | |

(Continued)

OTHER PUBLICATIONS

Microsoft Technet; "Migrating Files and Settings: A Step-by-Step Guide"; Published Jun. 1, 2001; 8 pages; Copyright Microsoft Corporation, All Rights Reserved.

(Continued)

*Primary Examiner*—Nadeem Iqbal (57) ABSTRACT

Computer tools and methods novelly combine periodic backup and restore features with migration features to transfer the components of a failed system to a new system, which new system may be dissimilar to the old system. As well as backing up and transferring critical data files during the disaster recovery operation, the present invention also transfers, inter alia, applications, user states, hardware settings, software settings, user preferences and other user settings, menus, and directories. In another aspect of the present invention, a network of shared end-user computers periodically backs up each individual end-user computer to a central instrumentality, in a novel manner to reduce storage and time requirements. That is, redundancies for the end-user computer backup files are eliminated or greatly reduced by only making reference to but not storing components that are generic to the system, and further for each previously stored component, only storing differential or incremental information, unless predefined conditions are met. In yet another aspect of the present invention, remote end-users upload, via a wide area network such as the Internet, backup information to a central location. In the case of end-user computer failure, backup and migration information can be delivered to a new machine by means such as mailing a storage medium (e.g., compact disc), and downloading from the Internet.

20 Claims, 5 Drawing Sheets

U.S. PATENT DOCUMENTS

| | | | |
|---|---|---|---|
| 6,938,058 B2 | 8/2005 | Henrickson et al. | |
| 6,963,908 B1 | 11/2005 | Lynch et al. | |
| 7,024,528 B2 | 4/2006 | Lecrone et al. | |
| 7,069,402 B2 | 6/2006 | Coulter et al. | |
| 7,082,553 B1* | 7/2006 | Wang | 714/38 |
| 2001/0034728 A1 | 10/2001 | McBride et al. | |
| 2001/0056438 A1 | 12/2001 | Ito | |
| 2002/0010808 A1 | 1/2002 | Wiggins et al. | |
| 2002/0083366 A1 | 6/2002 | Ohran | |
| 2002/0087588 A1 | 7/2002 | McBride et al. | |
| 2002/0104080 A1 | 8/2002 | Woodard et al. | |
| 2002/0160760 A1 | 10/2002 | Aoyama | |
| 2003/0009754 A1 | 1/2003 | Rowley et al. | |
| 2003/0037327 A1 | 2/2003 | Cicciarelli et al. | |
| 2003/0037328 A1 | 2/2003 | Cicciarelli et al. | |
| 2003/0105912 A1* | 6/2003 | Noren | 711/1 |
| 2003/0134625 A1 | 7/2003 | Choi | |
| 2003/0172373 A1 | 9/2003 | Henrickson | |
| 2004/0128203 A1 | 7/2004 | Pierre et al. | |
| 2004/0139128 A1 | 7/2004 | Becker et al. | |
| 2004/0158766 A1 | 8/2004 | Liccione et al. | |
| 2004/0163008 A1 | 8/2004 | Kim | |
| 2004/0199812 A1* | 10/2004 | Earl et al. | 714/13 |
| 2004/0220980 A1* | 11/2004 | Forster | 707/204 |
| 2004/0235523 A1 | 11/2004 | Schrire et al. | |
| 2005/0044232 A1 | 2/2005 | Keane | |
| 2005/0191998 A1 | 9/2005 | Onyon et al. | |
| 2005/0246575 A1 | 11/2005 | Chen et al. | |
| 2006/0010436 A1 | 1/2006 | Henrickson et al. | |
| 2006/0036658 A1* | 2/2006 | Henrickson | 707/204 |
| 2006/0036890 A1* | 2/2006 | Henrickson | 714/2 |
| 2006/0036895 A1 | 2/2006 | Henrickson | |
| 2006/0183469 A1 | 8/2006 | Gadson | |

OTHER PUBLICATIONS

Microsoft Technet; "User State Migration in Windows XP"; Published Jun. 1, 2001; 8 pages; Copyright Microsoft, All Rights Reserved.

* cited by examiner

COMBINED COMPUTER BACKUP, DISASTER RECOVERY AND MIGRATION IN A SHARED ENVIRONMENT

BACKGROUND OF THE INVENTION

1. Field of the Invention

The present invention broadly relates to computer backup and restore technologies. The present invention also broadly relates to computer migration technologies.

2. Background

The periodic backup of computer system components, such as files, data, applications and the like, is a well-known and oft practiced approach to storing a useful copy of a computer system in a previous state, should the system malfunction in some important way. The storage of the back-up copy can then be used to restore the system to the previous state when the system returns to viability. This may be the most common form of system back-up and restoration.

In the general case, currently available disaster recovery tools create back-up copies of computer systems that can be summoned and transferred to new systems when there is a catastrophic failure. These tools are efficacious for transferring the back-up copy en masse to the new system. However, problems arise when the new system is dissimilar to the old system. When they are sufficiently dissimilar, the transfer can cause problems ranging from system instability, to partial inoperability, to complete inoperability.

Prior art responses to the aforementioned problems include completely overwriting the new operating system with the old one during a full system restore, in order to avoid system conflicts and instability. Using this approach, however, the new system will not be able to take advantage of the new features of the newer operating system, and may not be compatible with newer application software.

To avoid overwriting the new operating system, some prior art approaches merely restore critical data files, leaving out applications, user settings, user preferences, and user state information. Incidentally, none of the prior art disaster recovery approaches is believed to restore user settings, user preferences, and user state information on the new system, whether or not the new system is similar to the old system.

U.S. patent application Ser. No. 09/378,999, filed Aug. 23, 1999, and titled "Application and Method for Transferring Information between Platforms," and which is also assigned to the Assignee of the present Letters Patent, discloses a computer migration method for the efficient transfer of information between a source computer and a target computer. The source and target computers need not have matched hardware or operating system characteristics. Along with data and applications, the aforementioned U.S. Patent Application also allows for the migration of, files, user settings and user preferences, and hardware settings. User-specific settings include internet bookmarks, e-mail settings, names, addresses, telephone numbers, and the like. Hardware-specific settings include the designation of MODEMS, printers, scanners, displays, and the like that are to be used.

The Abstract of the aforementioned U.S. Patent Application states:

> A method and apparatus for relocating application programs, settings, menus, files and documents from a source computer to a target computer. The method and apparatus function properly regardless of whether the source and target computers have the same hardware or operating system. The method includes scanning the source and target machines for all applications programs, settings, menus, files, and documents in order to create a relocation strategy. The relocation strategy is created in view of pre-programmed selection rules or selection rules created by the user. The strategy is then implemented by copying, replacing or merging data from the source machine to the target machine.

While the aforementioned U.S. Patent Application discloses useful migration approaches, it does not address disaster recovery, system back-ups used for disaster recovery, catastrophic system failures, and the need to restore the components from a backed-up, failed system to a new system.

Therefore, there is a great unfilled need to provide a tool or tools which can both completely backup computer systems and the like, and to allow the intelligent restoration of the backup information on a target computer system with a dissimilar hardware or operating system, so that the improvements of the target system over the source system are utilized, while maintaining the desirable information and settings from the source system.

The prior art problems associated with disaster recovery and then (as they are not integrated) migration are magnified in a network environment where a server or other central computer must perform these operations for a number of networked end-user computers. Chief among the problems are the astronomical storage space sometimes required to backup each networked computer, and the undue burden on the system resources during the many backup operations that can degrade overall system performance.

The prior art also lacks efficient means of availing safe, robust, and cost-effective backup and migration resources to a large number of computer users who do not have the wherewithal to perform their own extensive periodic backups that can be migrated to a new machine in the case of system failure or upgrade.

SUMMARY OF THE INVENTION

In view of the aforementioned problems and deficiencies of the prior art, the present invention provides an information backup and transfer method. The method at least includes periodically backing up and storing components of a source computer, and in the case of a source computer failure, transferring stored components to a target computer. The method is carried out in an environment where the source computer and target computer are dissimilar. The stored components at least include, as well as critical data files, native information pertaining to the source computer.

The present invention also provides an information backup and transfer system that at least includes a source computer adapted to have its components periodically backed up and stored, a target adapted to have transferred to it, stored components from the source computer in the case of a source computer failure, and a tool for facilitating the backup, storage and transfer of the stored components. The source computer and target computer are dissimilar in either hardware, or operating systems. The stored components at least included, as well as critical data files, native information pertaining to the source computer.

The present invention additionally provides an information backup and transfer method at least including:

a) networking a plurality of end-user computers to at least one host computer;

b) via each end-user computer, periodically cataloging the contents of the end-user computer, as well as the state of each component, and transferring components of the end-user computer to said host computer;

c) via the host computer, periodically backing up components from the end-user computers in a plurality of end-user computer backup profiles;

d) via the host computer, storing and cataloging components which are generic to a plurality of end-user computers;

e) prior to storing a component in an end-user computer profile, noting in the end-user computer profiles, particular generic components that are cataloged on the end-user computers;

f) comparing the state of cataloged end-user components with the state of corresponding generic components;

g) for each end-user computer, storing in the end-user computer profiles those components that are not generic;

h) for each end-user computer, storing in the end-user computer profiles differential backup indicia corresponding to the differences between the host computer version of generic components and the end-user computer version of generic components; and i) via the host computer, recreating and transferring backup components from a failed end-user computer to a different computer based upon the end-user computer profiles.

The present invention further provides an information backup and transfer system at least including a plurality of end-user computers, and at least one host computer networked to the end-user computers. Each of the end-user computers are adapted to periodically catalog its contents, as well as the state of each component, and transfer components of the end-user computer to the host computer. The host computer is adapted to: periodically back up components from the end-user computers in a plurality of end-user computer backup profiles; store and catalog components which are generic to a plurality of end-user computers; and prior to storing a component in an end-user computer profile, noting in the end-user computer profiles, particular generic components that are cataloged on the end-user computers. The host computer further at least includes a comparator adapted to compare the state of cataloged end-user components with the state of corresponding generic components, and a re-creator adapted to recreate and transfer backup components from a failed end-user computer to a different computer based upon the end-user computer profiles. The host computer is further adapted to, for each end-user computer, store in the end-user computer profiles those components that are not generic, and for each end-user computer, store in the end-user computer profiles differential backup indicia corresponding to the differences between the host computer version of generic components and the end-user computer version of generic components.

The present invention also provides a disaster recovery method that at least includes: a) providing a plurality of remote, end-user computers; b) providing at least one host computer adapted to centrally store end-user computer backup components; and c) providing a wide area networked communication link between the end-user computers and the host computer. The method also at least includes: d) uploading backup information to the host computer; e) via the end-user computers, periodically updating the backup information; and f) in the case of a failure of an end-user computer, transferring backup information pertaining to the failed end-user computer, to a computer designated by a principal of the failed end-user computer.

BRIEF DESCRIPTION OF THE DRAWING FIGURES

Features and advantages of the present invention will become apparent to those skilled in the art from the description below, with reference to the following drawing figures, in which.

BRIEF DESCRIPTION OF THE APPENDIX

The appendix contains an overview of the processes used for universal recovery according to the present invention.

DESCRIPTION OF THE PREFERRED EMBODIMENTS

General Computer Backup, Disaster Recovery and Migration

Figure 1:
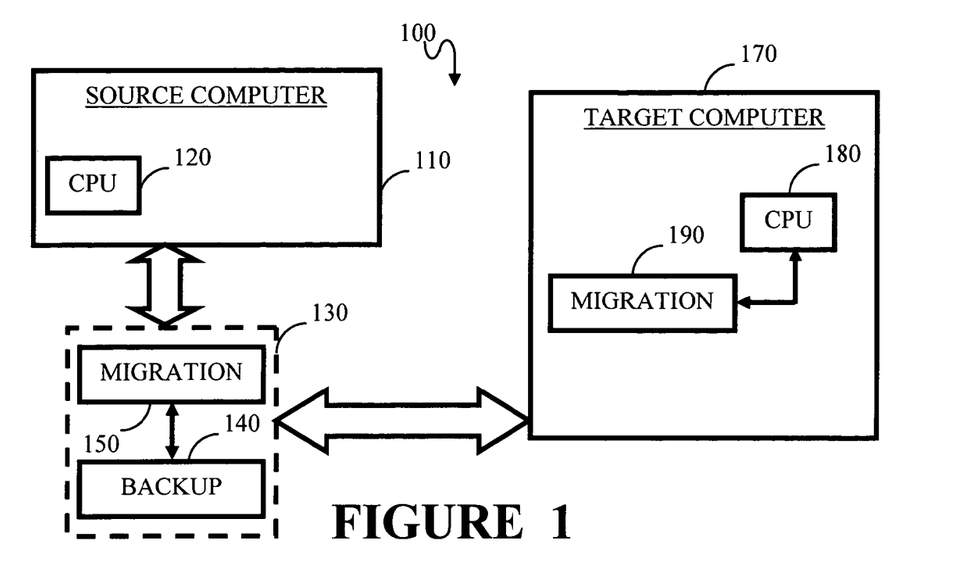
FIG. 1 is schematic diagram of a first embodiment of the present-inventive combined disaster recovery and migration system.

A first embodiment of the present-inventive system 100 for disaster recovery and migration is shown in FIG. 1. The system 100 shows a source computer 110 which is the subject of periodic backups, and in the case of catastrophic failure (or a lesser degree of failure determined by the user), will have its essence migrated to a "new" target computer 170. As will be understood by those skilled in the art, the computers shown nominally include many basic components, including central processing units (CPUs) 120, 180. In the environment of the present invention, the source computer and target computer may be dissimilar in their hardware or operating system makeup.

A novel backup/migration tool is shown in FIG. 1 as item 130. The backup/migration tool 130 contains as its main components, a backup element 140 for conducting periodic backups of the source computer 110, and a migration element 150 for migrating backed up components to the target computer 170 in the case of a system (110) failure. The backup/migration tool 130 is shown in FIG. 1 as a separate external module. However, those skilled in the art to which the present invention pertains will understand that the backup/migration tool 130 can also reside in the source computer 110. In the latter case, the module 130 could be coupled to an external storage medium (not shown) which could store not only the backup components, but migration software needed during any disaster recovery and migration operation.

Migration software 190 can also be loaded onto the target computer 170 to assist in any migration operation.

The backup and migration files created by the backup/migration tool 130 can be stored externally as part of a capsule to be used by the backup/migration tool 130 to restore the operating system, data, files, applications, user settings, etc. during a disaster recovery and migration operation. The aforementioned components collectively comprise a "user state." That is, the user state is analogous to a comprehensive "snapshot" of a system which reveals the details needed to construct the current status of a system. A novel feature of the present invention is therefore the storage of the user state in backup files, which can be utilized to reconstruct the system on new hardware during a migration operation. The user state is not a mirror image of the entire contents of the drive or other memory components of the system, but selective information that when properly utilized will allow the recreation of the system.

The present invention also novelly treats the user state not as a homogenous set of information, but a group of dependent yet separate layers of information that can be backed up separately, and at separate intervals, depending on the actual or expected amount of change of each component. For example, the operating system may need to be backed up only one time, as it may not be expected to change after it is installed. Data files, on the other hand may need to be backed up frequently, such as once a week, as those files may be expected to change frequently. Still other components such as user settings usually have mid-range dynamics, and might be expected to have a low frequency of variation, but still need regular backing up (e.g., once a month).

It is therefore part of the present invention to not only backup user states, but to employ a rules-based approach to back up different portions of the user state at different frequencies, depending on the actual or expected dynamics of the component. The ability to back up user state components using different backup frequencies allows periodic backup operations to optimize backup file storage space and other system resources by not having to backup all items during every backup operation, and to reduce the time needed for backup operations.

The backup of the components of the source computer 110 can be automated with regard to which components to backup, and the backup frequency for each component. This can be facilitated through the use of scripts or through the use of other approaches, such as the rules-based approach described in U.S. patent application Ser. No. 10/094,251, titled "Non-Script Based Intelligent Migration Tool Capable Of Migrating Software Selected By A User, Including Software For Which Said Migration Tool Has Had No Previous Knowledge Or Encounters," which is also assigned to the Assignee of the present Letters Patent. The Abstract of the aforementioned Application states in part:

[D]etermining how all of the files of a source computer are to be grouped (i.e., to which programs, files are associated) include examining installation log files created by "installation technology," where they exist. Where installation log files do not exist, the migration tool uses a rules-based approach to group files (into programs) according to common folders, common creation dates, common modification dates, and, examining file allocation tables, group files that are proximate. After assets are grouped into Application Groups, a Confidence Level test is performed to determine a degree of confidence that all of the items belonging to the Application Group have in fact been associated with the group. The user is presented with all of the Application Groups and their associated confidence level via an interactive display. The user then chooses programs, files and other assets to migrate to the target computer.

The present-inventive backup/migration tool 130 can serve as the sole backup program for a source computer. Alternatively, the present-inventive backup/migration tool 130 can interface with existing backup tools to create the aforementioned capsule. Both the traditional backup files and the capsule are then used during the migration process to recreate or reconstitute the essence of the source computer 110 on the target computer 170 when needed.

Figure 4:
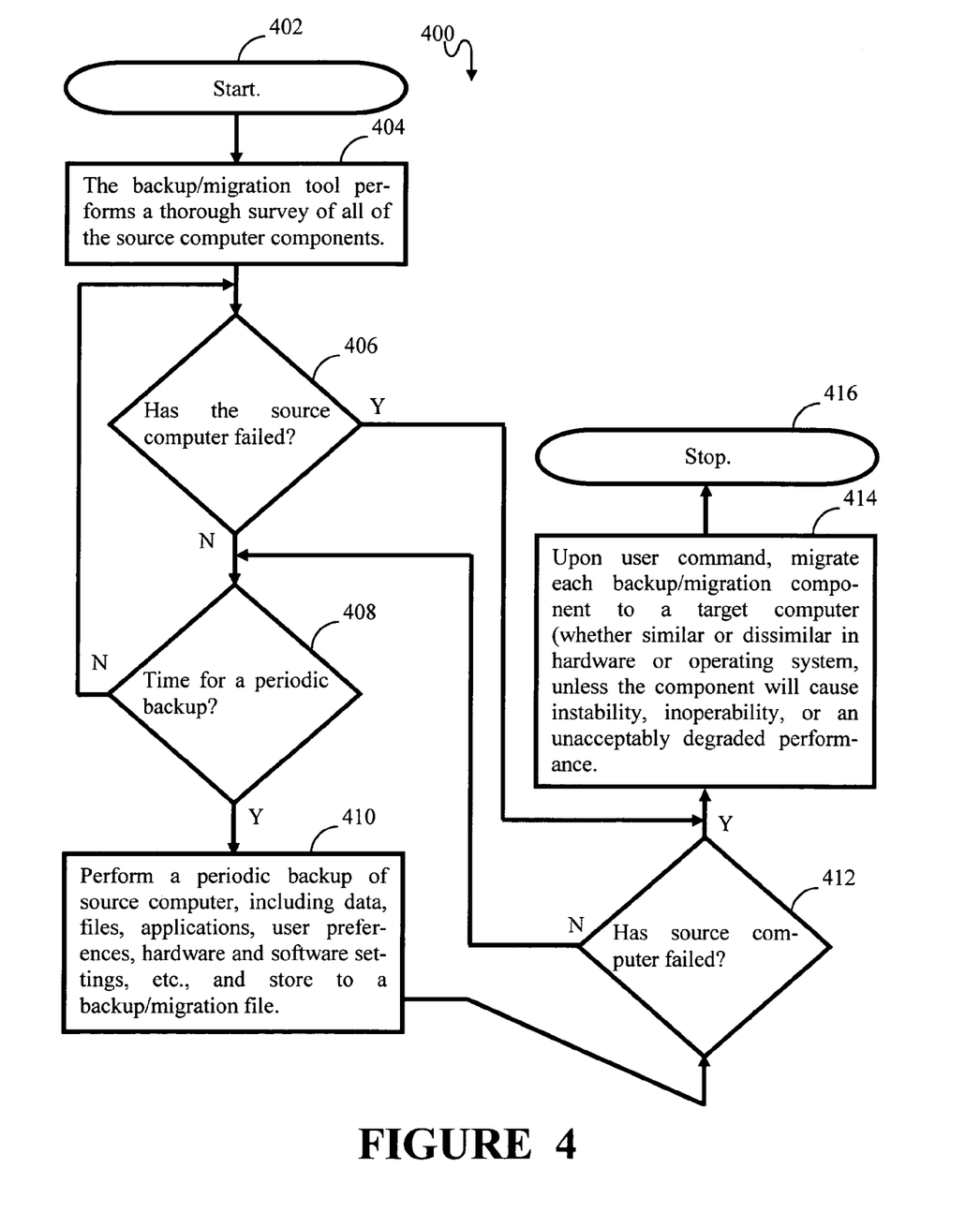
FIG. 4 is a flow chart illustrating the first embodiment of the present-inventive method for combined disaster recovery and migration.

The process employed by the backup/migration tool 130 is illustrated in the flowchart of FIG. 4.

After the start 402 of the program 400, the components of the source computer are classified during an inventory operation (Step 404) of the backup/migration tool 130 to place each item of the system into specific categories such as applications, settings, operating system and data. These categories aid in determining the frequency that each item will be backed up, as discussed supra.

In the next step 404 the backup/migration tool 130 determines whether the source computer 110 has failed. In case of a source computer failure, the program jumps to Step 414, where the migration process is started upon the user's command. System failure can be readily determined using known methods and protocols, including non-responsiveness to periodic externally generated signals. As is explained in Step 412, the source and target computers need not be similar, and components stored in the backup/migration file/capsule are transferred in the preferred embodiment unless they will cause system instability, inoperability, or unacceptably degraded performance. The program ends in Step 416.

If, however, the system has not failed, the backup/migration tool 130 determines whether a scheduled backup operation is to occur (Step 408). If it is not time for a periodic backup, the program returns to Step 406. If it is time for a periodic backup, the backup/migration tool 130 performs a periodic backup of the source computer in Step 410. As previously mentioned, the backup components include data, files, applications, user preferences, hardware and software settings, menus, directories, etc., as part of the user state.

In the preferred embodiment, Step 410 also determines the nature of changes periodically made to the source computer to gain knowledge of the most efficient way of backing up the components.

After the periodic backup has been performed, the program again determines whether the source computer has failed (Step 412). In the case of source computer failure, the program advances to Step 414, described supra. Otherwise, the program returns to Step 408.

The present invention is also applicable in so-called "mid-disaster" recovery situations. That is, those situations in which a computer is functioning at less than full capacity due to decay or instability in the operating system. In contrast to the prior art approach of perhaps requiring a technician to spend valuable time and resources attempting to diagnose the problem, a master image of a stable system along with any required applications can be applied to the system (thus, also eliminating the unstable operating system), and then re-imaging the backed up user state to restore the system to the previous albeit stable state. The aforementioned approach not only reduces technician time and end-user down time resulting from unstable systems, but is especially valuable in corporate environments, where relatively large numbers of computers may regularly become unstable.

Shared Environment Backup, Disaster Recovery and Migration

Figure 2:
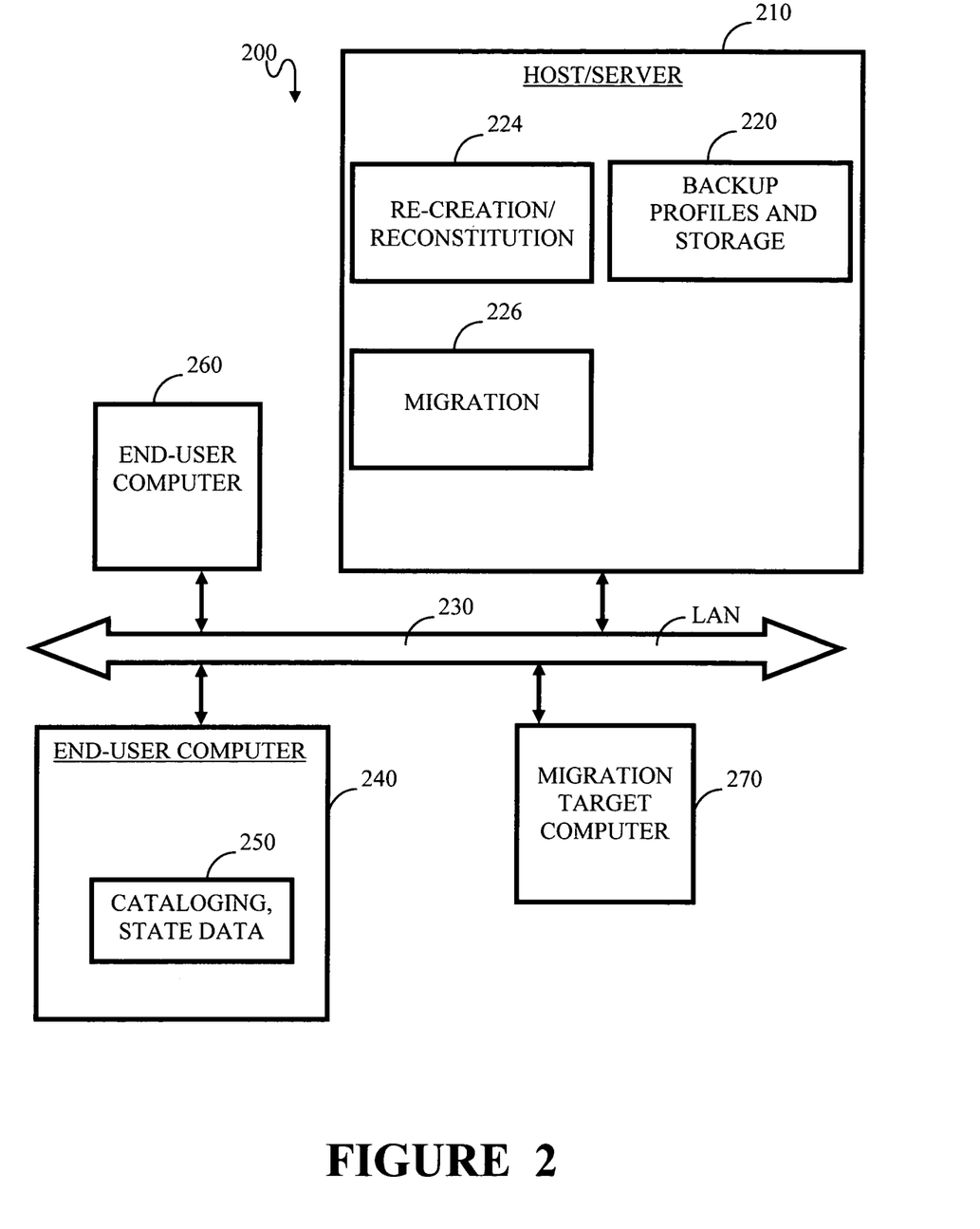
FIG. 2 is schematic diagram of a second embodiment of the present-inventive combined disaster recovery and migration system.

The present-inventive disaster recovery and migration combinations can also be employed in a shared environment, such as in the system 200 shown in FIG. 2. A number of end-user computers (240, 260) can be connected via a local area network (LAN) 230, or the like to a server 210 which serves to periodically store backup components for each end-user computer. Further, in the case of the failure of an end-user computer, the host/server computer 210 migrates the components of the failed end-user computer to a migration target computer 270. The system 200 might be used, for example, in a corporate IT/computing environment, where many users are connected via LAN or Intranet to one or more central computers.

As described in the Background Section, supra, among the problems associated with prior art shared computing environments with centralized backup (aside from the fact that migration is not a part of the same tool) is the enormous amount of memory required to backup all of the end-user computers, and the taxing of system resources (and the concomitant system performance degradation) when time-consuming backups occur. In response, the system 200 eliminates or greatly reduces unnecessary backup redundancies, both for each individual end-user computer, and for the system as a whole. This is essentially accomplished by storing for each end-user computer backup/migration file, only what is necessary to reconstitute or recreate the components of a failed system on a new target computer.

The backup/migration files therefore typically contain components only once, and store incremental or differential changes that have occurred since the previous backup of a particular component. This obviates the need for not only storing an entire component twice, but also obviates the need for an often time-consuming overwrite of an existing component, by storing much smaller incremental/differential change information.

Another aspect of redundancy elimination is using linking information in each end-user computer backup/migration file to place a link in the file (rather than the actual item) for all components that already exist in storage elsewhere in the system, whether the component has been stored for another end-user computer, or is a generic component stored and generally used by all or many of the shared users.

Several approaches can be used to determine whether a particular component should be stored in its entirety, or whether incremental/differential information (indicating how the component has changed since it was last stored or considered for storage) should be stored. Data and other components can be classified according to predefined criteria as either static (tending not to change over time) or dynamic (tending to change frequently over time), with static components not needing to be overwritten, and dynamic components needing to be periodically overwritten in between the storage of incremental/differential changes. This is because large changes to a component may make reconstruction of the current status of the component using the original component and incremental/differential information inefficient, and possibly less than fully reliable.

A more flexible approach stores a component for the first time (provided it has not already been stored elsewhere), and thereafter stores incremental/differential information unless certain preconditions exist. One precondition is the passage of a predetermined amount of time. Another precondition is the change of a predetermined amount of the component since it was last stored.

Each end-user computer periodically creates a catalog of all of the backup components as well as the current state of the end-user computer, including the state of each component. When the end-user computer performs a backup operation by transferring components to the host/server, it determines by comparing its catalog to the catalog of stored items on the system 200, which version of a component is the most up to date. If the local version is more up to date, that version is backed up. If the host/server version of the component is more up to date, the host/server is directed to store that version (or a link to that version) in the end-user computer's backup/migration file.

The host/server 210 in the system 200 nominally contains a unit 220 for backing up and storing components of the end-user computers, a recreation/reconstitution unit for recreating the components of a failed end-user computer, and a migration unit for migrating the recreated components to target computer.

Figure 5:
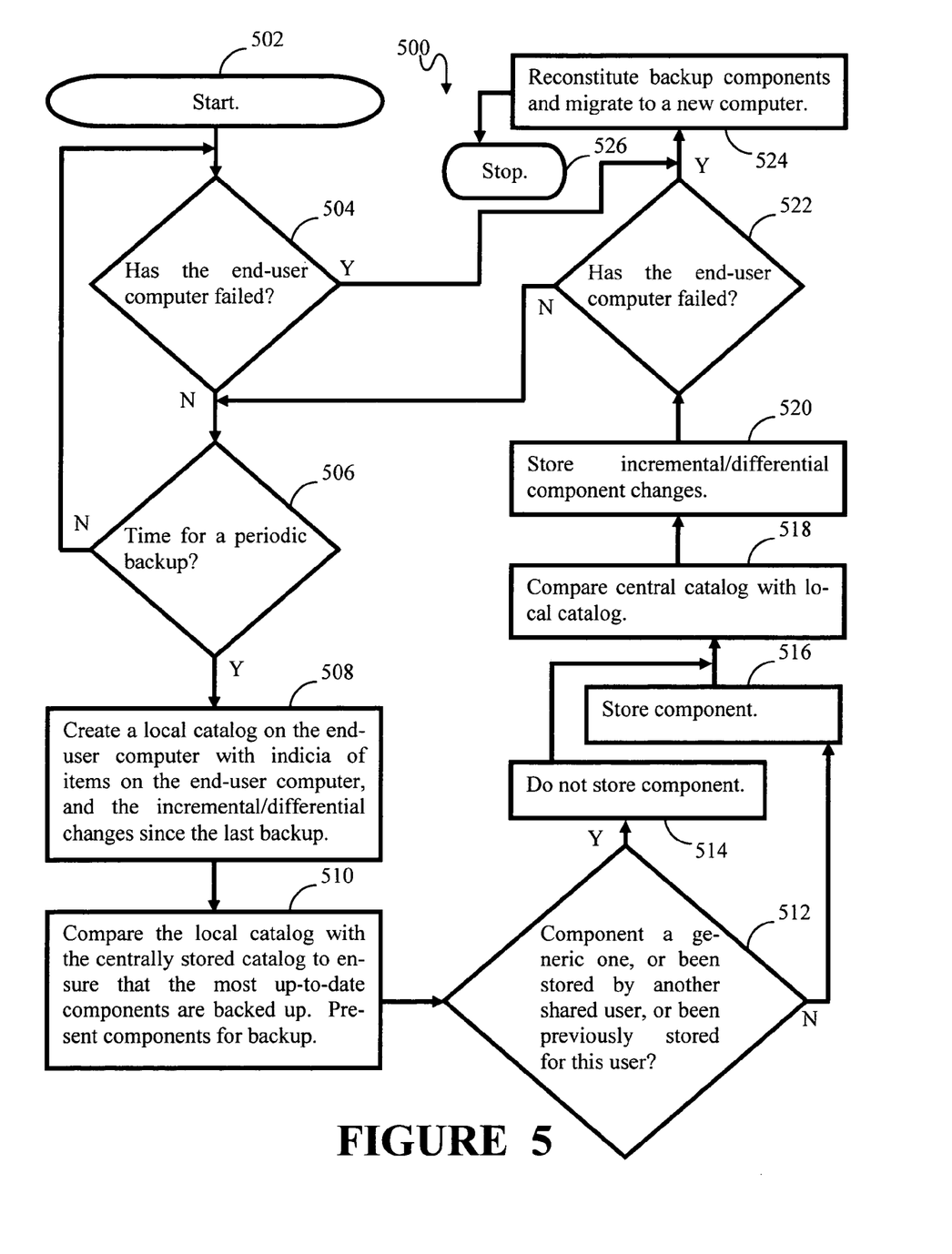
FIG. 5 is a flow chart illustrating the second embodiment of the present-inventive method for combined disaster recovery and migration.

The flowchart in FIG. 5 details the program 500 used by the shared environment aspect of the present invention.

After the start (Step 502), the program determines whether an end-user computer has failed (Step 504). If an end-user computer has failed, the program jumps to Step 524, where the host computer reconstitutes the backup components of the failed end-user computer and migrates them to a target computer. The program stops in Step 526. If the end-user computer has not failed, the program advances to Step 506, where it determines whether it is time for a periodic backup of the end-user computer. The program returns to Step 504 if it is not time, but advances to Step 508 if it is time for a periodic backup.

The aforementioned local catalog is created or updated in Step 508. Prior to transferring components to the host computer, the local catalog is compared with the host computer catalog of all items stored, to determine which versions of the end-user components are most up to date (Step 510). If the most up-to-date version resides on the end-user computer, it is transferred to the host for storage; if the host version is most up to date, it is stored in the backup file (or a link is placed in the backup file).

In Step 512, the program determines whether the component is a redundant one. If it is not redundant, it is stored in Step 516. If the component is a redundant one, it is not stored or restored (Step 514). The program compares the central catalog with the local catalog (with respect to the component) in Step 518, and incremental/differential changes to the components are stored where appropriate (Step 520).

In Step 522, the program again determines whether the end-user computer in question has failed. If it has failed, the program executes Steps 524 (described supra) and 526. Otherwise, the program returns to Step 506.

Remote Disaster Recovery Service and Migration Information Delivery

In addition to the novel combinations and features described above, the present invention also includes a novel Disaster Recovery Service for the remote storage of end-user computer components, and for the delivery of migration information in the case of system failure to a new end-user computer. This is shown schematically as the system 300 in FIG. 3.

Figure 3:
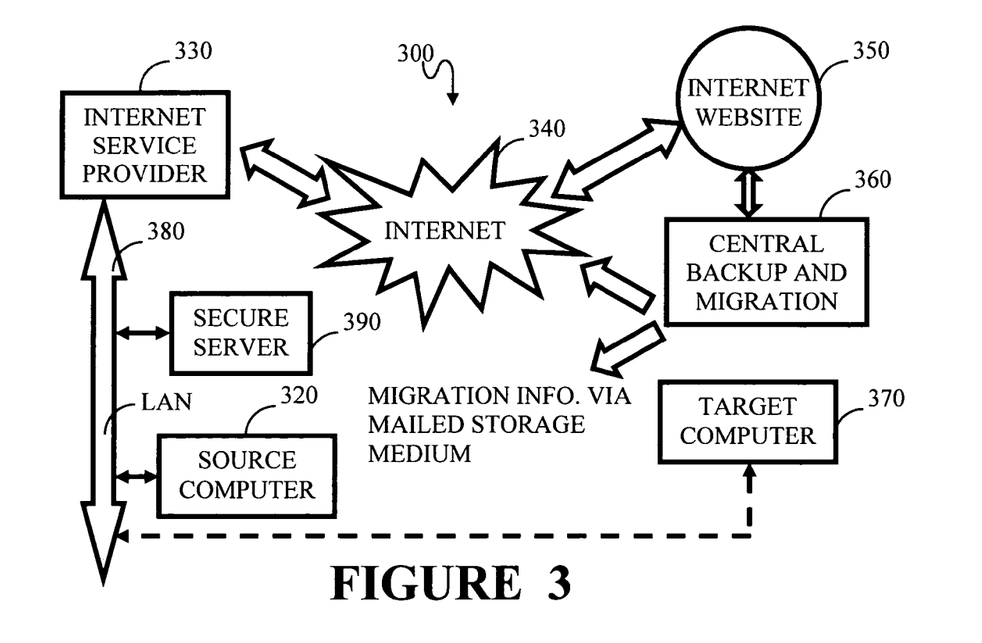
FIG. 3 is schematic diagram of a third embodiment of the present-inventive combined disaster recovery and migration system.

The essence of this aspect of the present invention is the remote, centralized backup of end-user computers in an application service provider environment. In the system 300, a source computer can connect to a wide area network 340 such as the Internet to a website 350 controlled by a Disaster Recovery Service. The website 350 is connected to a central backup and migration computer 360 for the backup and migration (in the case of source computer failure) of numerous end-user computers. Those skilled in the art will appreciate that other components may be required for a viable system, depending on the user's environment, such as a LAN, and an Internet Service Provider (ISP).

The computer customer periodically uploads backup components to the central backup and migration computer 360 via an Internet link. If the backed up computer should fail, the customer can connect to the website via another computer, and direct the Disaster Recovery Service to delivery backup and migration information to a target computer 370 of the customer's choice.

The delivery can be in a variety of ways. For example, the central backup and migration computer 360 can download the backup and migration information to the target computer 370 via an Internet link for the automatic migration of the failed computer's components to the new computer. The Disaster Recovery Service can also deliver the backup and migration information to the customer via traditional mail, or kiosk, etc. on storage media such as CDs, DVDs, ZIPP® disks, etc., for the customer's installation on a replacement computer.

Figure 6:
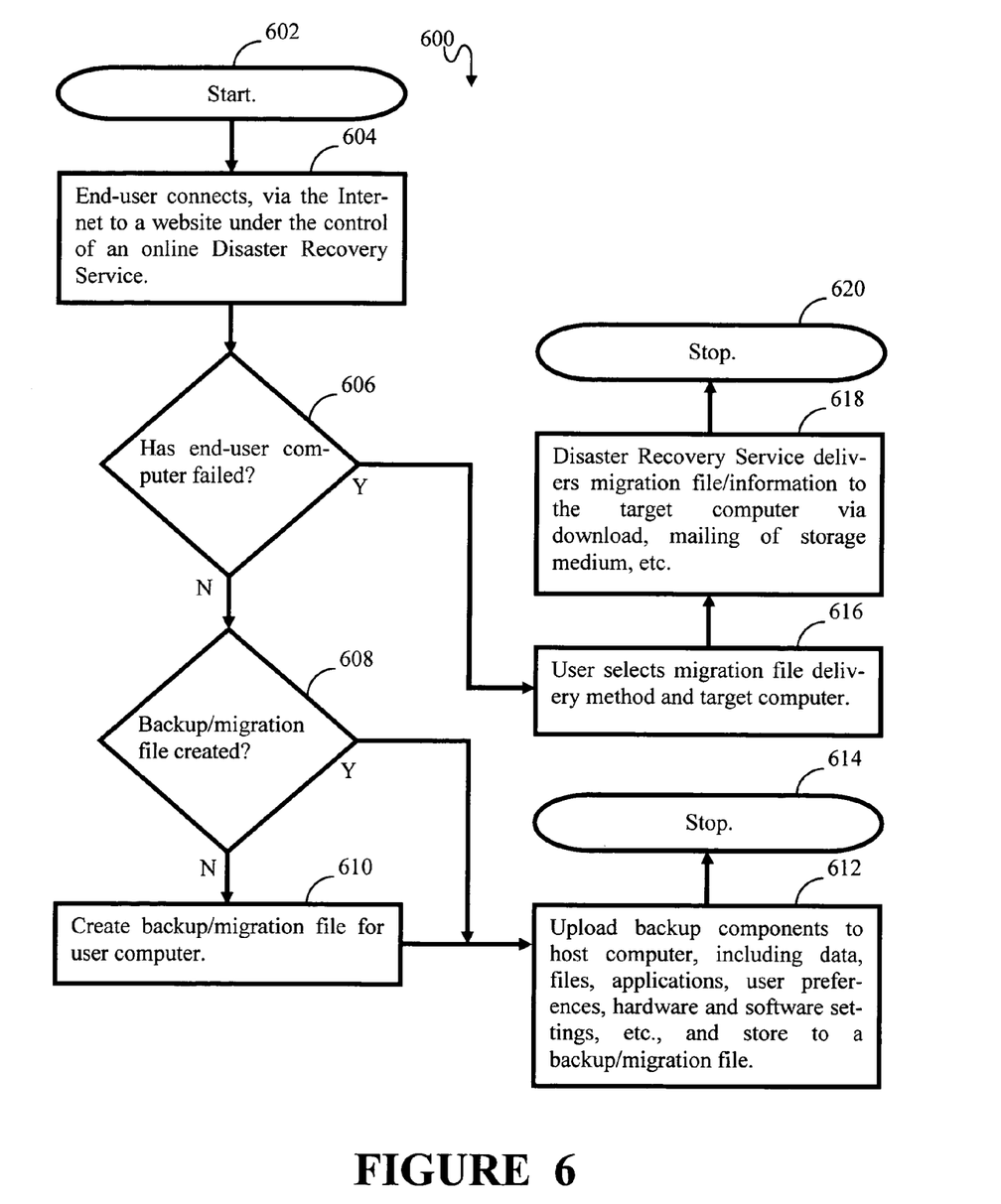
FIG. 6 is a flow chart illustrating the third embodiment of the present-inventive method for combined disaster recovery and migration.

The system 300 implements the program 600 shown in FIG. 6. After the Start (602), the end-user or customer connects to an online Disaster Recovery Service website 350 in Step 604. In Step 606, the program 600 determines (via the interactive information furnished by the customer) whether the customer's backed up computer has failed. If the customer's computer has failed, the program 600 jumps to Step 616, where the customer selects his/her method of delivery of the backup/migration information.

In Step 618, the Disaster Recovery Service delivers the backup/migration information to the new computer or customer (if the customer will install the information), followed by the end of the program (Step 620).

Returning to Step 606, if the customer's computer has not failed, the program 600 determines whether a backup/migration file has been created (Step 608). If the backup/migration file exists, the program 600 jumps to Step 612. Otherwise, a backup/migration file is created in Step 610.

The customer uploads backup components to the central backup and migration computer 360 in Step 612. The program stops in Step 614. Among the components that can be both stored by Disaster Recovery Service and migrated to a replacement computer in the case of a disaster are data, files, applications, user preferences, and hardware and software settings.

In summary, the present invention is a comprehensive, flexible, and robust computer disaster recovery approach which leverages the intimate knowledge gained of the source computer, the knowledge of the target computer, and the knowledge gained through rules and scripts, to allow for efficient, and yet extensive and "personalized" backups, as well as efficient migration to the target computer of the important and personal components of the source computer, while intelligently leaving behind (or allowing the user to choose to leave behind) those elements that will hamper the operation or stability of the target computer, or intelligently leaving behind (or allowing the user to choose to leave behind) duplicate elements which are more contemporary or improved on the target computer.

Stated another way, in contrast to the typical prior art disaster recovery approaches to either: 1) backing up most components of the source computer and transferring the backed up components en masse to a target computer when the source computer fails, which does not allow the user to take full advantage of improvements that may be present in a more recent software that may occupy the target computer, or may cause instability or inoperability; or 2) backing up only "critical" files and data, and not being able to migrate applications, drivers and other important software to prevent potential conflicts between the old system and the new system, neither of which approach stores the "user state" described supra; the present-inventive approach provides greater granularity and flexibility in the backup/disaster recovery/migration processes in a manner that allows the flexible and intelligent selection of the components to backed up to provide as much of a duplicate of the source computer to the target computer as is feasible or desired in the case of disaster recovery, the flexible and intelligent selection of the frequency at which individual components are to be backed up to optimize system resources, and the flexible and intelligent selection of the components to be migrated to the target computer to provide a new system that contains a personalized legacy of the old system, but with optimized functionality of the new system as desired.

Variations and modifications of the present invention are possible, given the above description. However, all variations and modifications which are obvious to those skilled in the art to which the present invention pertains are considered to be within the scope of the protection granted by this Letters Patent.

APPENDIX

The following is a brief outline of the universal recovery process according to the present invention.

Overview of process and technology
*Sample overview of classification scheme and technologies available to perform universal recovery.*

1. Classification Techniques
    a. Public Data
        i. Universally redundant system files
        ii. Universally redundant application files
        iii. Universally redundant data files
    b. Personal data
        i. Created once, never modified
        ii. Often modified
        iii. Rarely modified 2. Technical Implementation
    a. Universal File Storage Database
        i. One file for every PC that uses this file
        ii. File Descriptor to indicate uniqueness
        iii. Concept of groups of files
            Such as a file set for a known application or operating system.
    b. Individual PC Repository
        i. Static Data
            1. One entry for each and any known group or set of files
            2. One entry for each and any known single file
        ii. Dynamic data
            1. One entry for each personal file
                a. "Complete Backup" entry
                b. "Incremental" or "Differential" entry
            2. One entry for User State/Settings information
                a. "Complete Backup" entry
                b. "Incremental" or "Differential" entry
    c. Known technologies
        i. Compression
        ii. Intra-file delta detection
        iii. Database
        iv. File Server
        v. Security and encryption
        vi. Communication, resiliency

Universal/Shared Static Files:
*The same files are shared and proliferated throughout the computing world.*

1. Level one: operating system files
*Files do not change, Files are occasionally updated/replaced, Files are the same for millions of users.*
These files are well-known and common, and would be available on the central database.

2. Level two: application files
*Files are added when a new application is installed, Files do not change, Files are occasionally updated/replaced. Files are the same for thousands, and for some popular apps, millions of PCs.*
These files are well-known and common, and would be available on the central database.
Less common applications, and patches, would only require one "save", and then become available to all users.

This would certainly apply as well to large Intranets, where many documents are being shared.

3. Level three: common Internet available files
*Files are added often, Files do not change. Files are the same for thousands, for some popular files, millions of PCs.*
Most Internet available multimedia files create a huge level of redundancy of large files that and end-user would not wish to lose. Only one copy of a common MP3 file would avoid the backup of 3-5 Megabytes of data for hundreds of thousands of users. Only one copy of a movie file (AVI, MPG, Quicktime, DivX, etc.) would save 100's of Megabytes even Gigabytes in the very near future.

This would certainly apply as well to large Intranets, where many documents are being shared.

Personal Files
*These common files could either be handled over the Internet, with encryption and secure transfer. However, it can be assumed that some folks can perform these operations via traditional means, with a local backup solution.*

4. Level Four: Personal Static Files
*Files are added often, Files do not change. Files are unique for this individual PC.*

Each file in this group can potentially reach several Megabytes in size, and needs to be handled by typically known one-time archiving methods. Any means which provides the ability to perform this function under 8 hours, or behind the scenes (non-intrusive background computing with error-recovery) would suffice. This group of files currently includes large digital image/photo files, and probably in the near future, digital movies. Therefore, it can be estimated that today a digital camera produces an image of approximately 1MB per photo. An aggressive estimate would be that during a weekend, one might need to therefore backup 100MB. At currently available Internet upload speeds, such as 56Kbps (approx. 5 KB/s) this could take around 6 hours. As more effective Internet means become available, this process will be improved. At the same time, it can be assumed that larger data files will also become more prevalent, therefore leaving the requirement that any online backup solution will require some long on-time.

5. Level Five: Personal Dynamic Files
*Files are created once, files change a lot. Files are unique for this individual PC.*

Email files are the largest known target of this class of file. Other local database files, such as contact management files, may also qualify. The solution is to use a delta between recent changes to the file and the whole content of the file is several orders of magnitude. For example, a 1GB email storage file may change by only several Kilobytes or a few Megabytes during the course of a week.

Recovery Service Options
*The following options are envisioned to handle recovery, catastrophic failure, or even simply a change to a new PC.*

It may not be practical to use on-line Internet connections to restore to recover a system that has backed-up several Gigabytes of data.

1. CD or DVD Image Service (Full Recovery)
*Upon request, a set of CDs or DVD s will be sent to the end-user which will automatically repair the PC to the latest state, or any prior state requested and archived.*

The PC will be completely overwritten, including the replacement of any existing operating system. Alternatively, if the PC is in working order, or if the hardware and/or operating system has changed, a selective restore of any combination of applications, settings, user profiles, and files may be performed from the CD/DVD media.

2. CD or DVD Image Service plus on-line
*A set of CDs or DVD s will be sent to the end-user which will automatically return any PC to a "baseline" state.*

If it would not be practical to wait for CDs or DVDs to be delivered, the service will provide media on an ad-hoc or regular basis. The recovery can be performed, and the changes since the last media can be retrieved from the on-line source.

3. On-line Only
*The user would "re-image" or "restore" their PC to its original state, followed by a complete or selective on-line restore.*

Using low cost, high-speed download Internet connections, which are already available (such as cable modems or aDSL home and business connectivity today), then it is already practical today to assume that even large quantities of data can be restored from an on-line source. Most PCs are shipped with full recovery/restore options, such as the recovery CDs/DVDs/or partitions. In the case of businesses, often a replacement PC is already available, and just needs to be personalized.

4. On-line OEM
*In the event of catastrophic failure which results in hardware replacement, the OEM could restore the PC prior to sending the user the PC, thereby saving additional time and letting many users benefit from the high-speed infrastructure available to the OEM.*

5. On-line Retail
*In the event of catastrophic failure which results in hardware replacement, the end-user may purchase a new PC at a local store. The store could offer the replacement service as well, in order to deliver the new PC ready to go.*

NOTE: Any of these solutions can be implemented at a corporate Intranet level to provide security and better performance, for example.

Usage Scenario: End-User
*Example Internet/online usage scenario from the end-user point of view.*

Initial Setup
A wizard would guide the user through the following steps:
1. A simple Interview format would garner the user's:
    a. Security Requirements
    b. Backup needs
        i. When (time, critical data modified, # of files, amount of data)
        ii. How (Internet, Local)
        iii. Performance (non-intrusive/slower vs. high-speed)
2. The PC state and contents would be cataloged
3. The initial "complete" backup would begin
    a. Estimated data: 25 MB
    b. Estimated time: 1-2 hrs. background processing
4. A background process would be established for continuous backup.

Continuous Usage
The PC is monitored until the "When" to backup criteria is reached, and then the appropriate backup is started based on the "How" and "Performance". An existing technology would provide a secure and robust connection.

Disaster Recovery Options
User can use any of the previously described On-line, CD/DVD, OEM, or local disaster recovery options.

What is claimed is:

1. An information backup and transfer method, said method comprising:
   a) networking a plurality of end-user computers to at least one host computer;
   b) via each end-user computer, periodically cataloging the contents of the end-user computer, as well as the state of each component, and transferring components of the end-user computer to said host computer;
   c) via said host computer, periodically backing up components from said end-user computers in a plurality of end-user computer backup profiles;
   d) via said host computer, storing and cataloging components which are generic to a plurality of end-user computers;
   e) prior to storing a component in an end-user computer profile, noting in said end-user computer profiles, particular generic components that are cataloged on the end-user computers;
   f) comparing the state of cataloged end-user components with the state of corresponding generic components;
   g) for each end-user computer, storing in said end-user computer profiles those components that are not generic;
   h) for each end-user computer, storing in said end-user computer profiles differential backup indicia corresponding to the differences between the host computer version of generic components and the end-user computer version of generic components; and
   i) via said host computer, recreating and transferring backup components from a failed end-user computer to a different computer based upon said end-user computer profiles.

2. The method of claim 1, wherein said end-user catalog also comprises for each component, indicia of the differences between the current state of the component versus the previously backed up state of the component.

3. The method of claim 1, wherein step g) further comprises storing in said end-user computer profiles, along with each component, an indication of the change in the previously stored component.

4. The method of claim 3, further comprising overwriting a stored component with a new version of the stored component when a predetermined condition is met.

5. The method of claim 4, wherein said predetermined condition comprises the passage of a predetermined amount of time since a stored component was initially stored.

6. The method of claim 4, wherein said predetermined condition comprises a predetermined amount of change to the stored component.

7. The method of claim 1, wherein said stored components comprise indicia corresponding to a user state.

8. The method of claim 1, wherein said stored components comprise user-specific settings.

9. The method of claim 1, wherein said stored components comprise hardware-specific settings.

10. The method of claim 1, wherein said stored components comprise menus or directories.

11. An information backup and transfer system, said system comprising:
   a plurality of end-user computers; and
   at least one host computer networked to said end-user computers;
   each said end-user computer being adapted to periodically catalog the contents of the end-user computer, as well as the state of each component, and transfer components of the end-user computer to said host computer;
   said host computer being adapted to:
      periodically back up components from said end-user computers in a plurality of end-user computer backup profiles;
      store and catalog components which are generic to a plurality of end-user computers; and
      prior to storing a component in an end-user computer profile, noting in said end-user computer profiles, particular generic components that are cataloged on the end-user computers;
   said host computer further comprising:
      a comparator adapted to compare the state of cataloged end-user components with the state of corresponding generic components; and
      a re-creator adapted to recreate and transfer backup components from a failed end-user computer to a different computer based upon said end-user computer profiles;
   wherein said host computer is further adapted to, for each end-user computer, store in said end-user computer profiles those components that are not generic, and for each end-user computer, store in said end-user computer profiles differential backup indicia corresponding to the differences between the host computer version of generic components and the end-user computer version of generic components.

12. The system of claim 11, wherein said end-user catalog also comprises for each component, indicia of the differences between the current state of the component versus the previously backed up state of the component.

13. The system of claim 11, wherein said end-user computers are further adapted to transfer to said host computer, along with each component, an indication of the change in the previously stored component.

14. The system of claim 13, wherein said host computer is further adapted to overwrite a stored component with a new version of the stored component when a predetermined condition is met.

15. The system of claim 14, wherein said predetermined condition comprises the passage of a predetermined amount of time since a stored component was initially stored.

16. The system of claim 14, wherein said predetermined condition comprises a predetermined amount of change to the stored component.

17. The system of claim 11, wherein said stored components comprise indicia corresponding to a user state.

18. The system of claim 11, wherein said stored components comprise user-specific settings.

19. The system of claim 11, wherein said stored components comprise hardware-specific settings.

20. The system of claim 11, wherein said stored components comprise menus or directories.

* * * * *